Patented Oct. 31, 1933

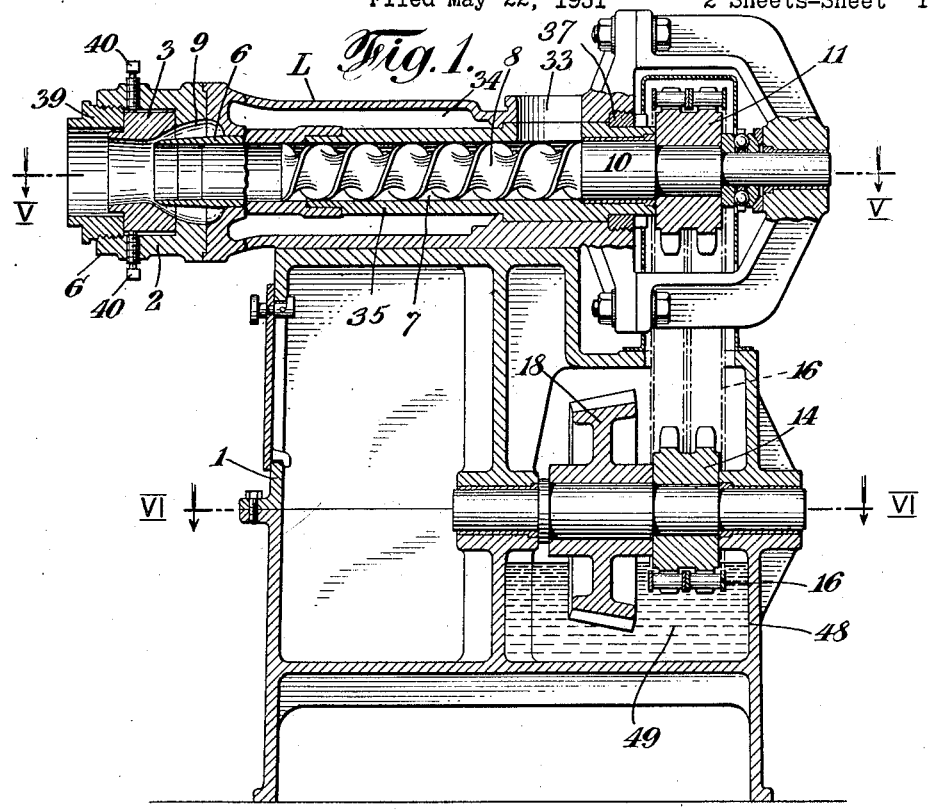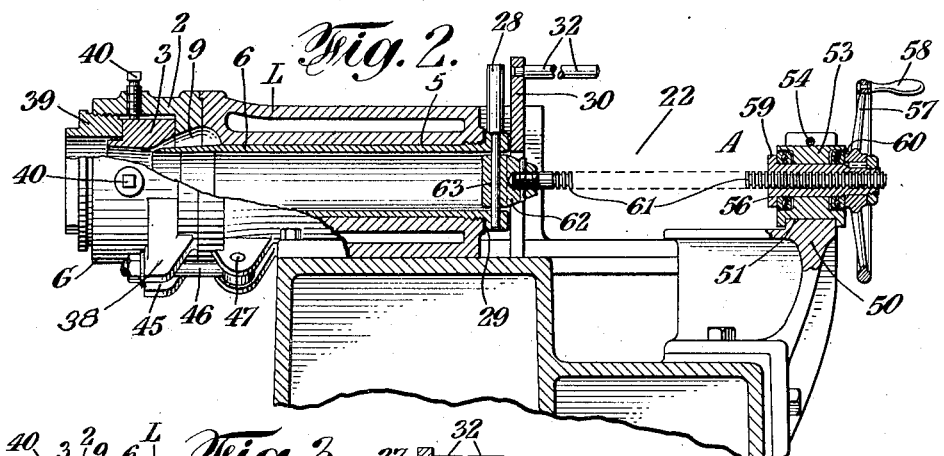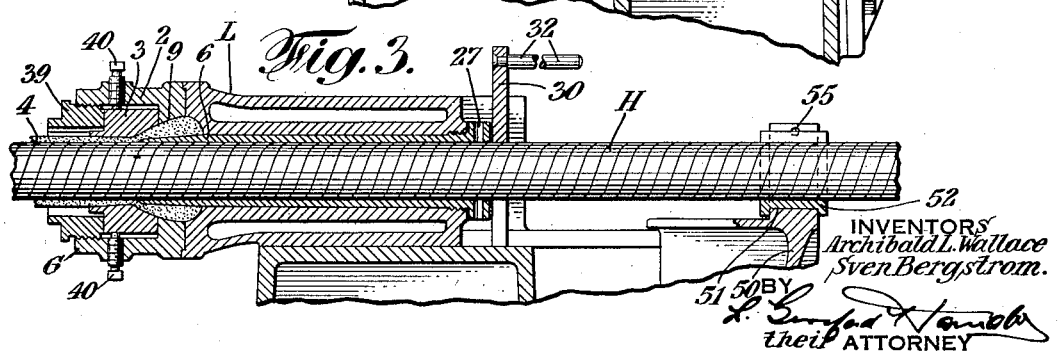

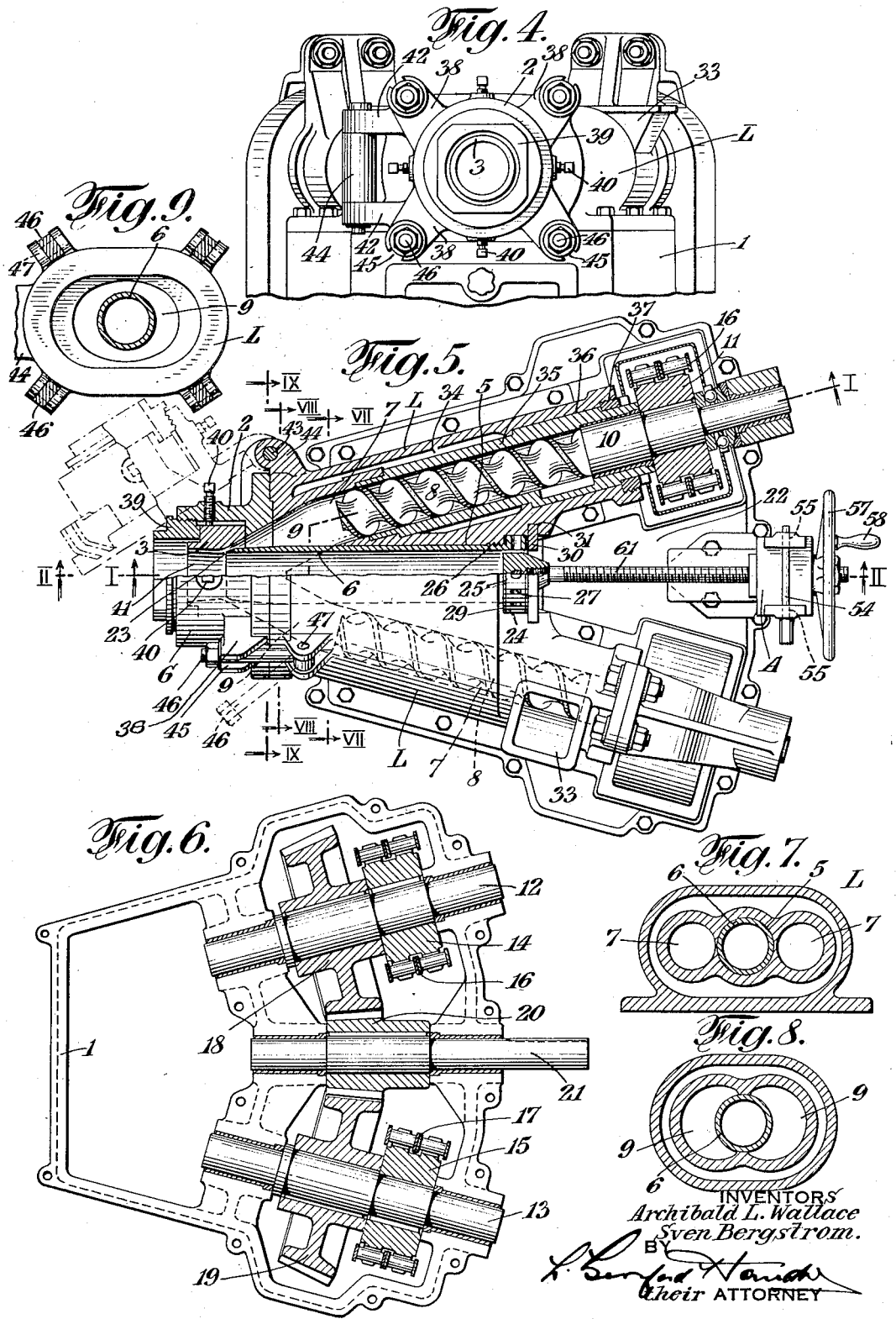

1,933,528

UNITED STATES PATENT OFFICE 1,933,528

HOSE MAKING MACHINE

Archibald L. Wallace and Sven Bergstrom, Brooklyn, N. Y., assignors to John M. Oden, Brooklyn, N. Y.

Application May 22, 1931. Serial No. 539,193

8 Claims. (Cl. 18—13)

This invention relates to a hose making machine, being in the nature of an improvement upon the structure disclosed in patent issued to John M. Oden, No. 1,322,464, Nov. 18th, 1919.

An object of the invention is to provide a simple and more efficient machine whereby a coating of rubber or the like may be applied to hose and similar articles in such manner that the coating is of substantially uniform density throughout, the rubber being fed to the hose from opposite sides, and the feeding means thereby serving as agitator and mixer means to improve the uniformity of application of the rubber onto the hose.

A more detailed object is to so construct the machine as to provide easy accessibility into the mixing chamber and the guide tube employed.

A further detailed object is to provide for easy removability of the guide tube employed.

A further detailed object is to provide for a desirable amount of adjustment of the guide tube and for its positive retention in an adjusted position.

A further object is to provide improved driving gear mechanism for the two feed screws employed.

A further detailed object is to provide a separately formed attachment, normally not connected with the machine, but having parts cooperative with parts of the machine whereby the attachment may be mounted upon the machine, the attachment when mounted being operable to forcefully remove, or insert, the guide tube.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a vertical sectional view through a machine constructed in accordance with this invention, the section being taken substantially upon the plane of line I—I of Fig. 5.

Fig. 2 is a similar sectional view of the upper portion of the machine but being taken substantially upon the plane of line II—II of Fig. 5, and showing the guide tube attachment in place.

Fig. 3 is a sectional view similar to that seen in Fig. 2 but the guide tube attachment being removed and a hose being shown in position extending through the guide tube and in course of being covered with a jacket of rubber.

Fig. 4 is an end elevational view of the upper portion of the machine, as viewed from the left end as seen in Fig. 1.

Fig. 5 is a top plan view of the machine, a portion being shown in horizontal section substantially upon the plane of line V—V of Fig. 1.

Fig. 6 is a horizontal sectional view through the machine substantially upon the plane of line VI—VI of Fig. 1.

Fig. 7 is a detail sectional view substantially upon the plane of line VII—VII of Fig. 5.

Fig. 8 is a similar sectional view substantially upon the plane of line VIII—VIII of Fig. 5, and Fig. 9 is a view of the left hand end of the machine with the die and its carrier removed, said view being taken upon the plane of line IX—IX of Fig. 5, and looking in the direction of the arrows on said line.

Referring now to the drawings for describing in detail the exemplary structure illustrated therein, the reference character L indicates the main body of the machine which is herein illustrated as being mounted upon a carrying base 1. The reference character G indicates the head which includes the die carrier 2 and the die 3. And the reference character H indicates the tube or like article which is being fed through the machine to receive its rubber coating 4.

The body L is formed with an opening 5 extending longitudinally centrally therethrough within which is arranged the guide tube 6 through which the hose or tube H passes.

At each side of the guide tube 6 is provided a screw pocket 7 containing a screw 8. These two screw pockets are arranged in divergent relation so that their forward open ends as 9—9 stand nearest to the guide tube 6, while their rear ends are furtherest spaced apart.

The two screws 8—8 may be driven in any suitable manner, but the present improvement proposes that they be connected with shafts 10 which carry, beyond the outer ends of the screw pockets, appropriate sprocket wheels 11 fixed thereto. It will be understood that although only one of the shafts 10 and sprockets 11 are illustrated in detail yet each of the screws is connected with a shaft 10 and sprocket 11.

Mounted in the carrying base 1, at a plane below the horizontal plane of the two screws is a pair of shafts as 12 and 13. Upon the shaft 12 is mounted a sprocket wheel 14 and upon the shaft 13 is mounted a sprocket wheel 15. A sprocket chain 16 provides driving connection between the sprocket 14 and the sprocket 11 directly above the sprocket 14, while a sprocket chain 17 provides driving connection between the sprocket 15 and the sprocket 11 which is above the sprocket 15.

The sprockets 14 and 15 are fixed to their respective shafts, and fixed to said shafts are also gears 18 and 19 in constant mesh with an intermediate pinion gear 20 carried upon a centrally disposed drive shaft 21 which projects a suitable distance beyond the base 1 to receive appropriate power drive connections, as will be readily understood from an inspection of the drawings, particularly Fig. 6.

The shafts 12 and 13 are preferably arranged in divergent relation to each other substantially parallel beneath the respective screws 8, as indicated in Fig. 6.

It will be understood that rotation of the shaft 21 by suitable power means, operating through the gears 18 and 19 and sprocket chains 16 and 17 will rotate the two screws 8—8 simultaneously, and it will be further understood of course that the pitch of the threads of said screws is appropriate to effect movement of the contents of the pockets 7 longitudinally along said pockets to the common mixing chamber 9.

This arrangement of driving connections from the source of power leaves an unobstructed space 22 above the top of the base 1 and between the two screws admirably adapted for the mounting of the separately formed detachable attachment as A intended for the placement and displacement of the guide tube 6, as hereinafter explained. It also makes possible the employment of a guide tube of suitable short length removably held in operative position.

The guide tube 6 may be held removably in operative position in any appropriate manner but the drawing herewith shows this tube to be slidably mounted within the central opening 5 of the body L. Its forward end extends into the mixing chamber 9 between the two screws and terminates in appropriately close proximity to the die 3 at the forward end of the mixing chamber so that a suitable annular passage as 23 is provided in the usual relation through which the rubber may be fed onto the passing hose tube as indicated in Fig. 3. The rear end of the guide tube 6 opens into the space 22. It is formed with a head 24 which provides an annular shoulder 25 exteriorly thereon adapted to engage against an abutting portion of the body L to limit the forward movement of the guide tube in a precise relationship. Suitable screw threads 26 may be provided upon the tube exteriorly thereof adjacent to the head 24 for co-operative engagement with similar threads provided in the opening 5 of the body for more completely and firmly anchoring the tube within the body.

If longitudinal adjustment of the tube 6 toward or away from the die 23 is required it is simply necessary to rotate the tube, thereby utilizing the threads 26 to effect the required longitudinal adjustment.

A series of openings 27 may be provided through the head 24 for receiving a tool as 28, see Fig. 2, wherewith to rotate the tube as required.

In some instances one or more shims as 29 may be provided between the shoulder 25 and the abutting portion of the body to make up a suitable surface against which the shoulder 25 may be forced when being adjusted, thereby more permanently and efficiently holding the tube against accidental longitudinal movement after adjustment.

In some instances also a removable back stop 30 may be slid into position behind the outer end of the guide tube to further insure against unintentional displacement of said tube. This back stop may be received in a vertical guide-way 31 provided in the body L, and it may have a handle 32 by which it may be conveniently lifted out whenever its removal is required.

Suitable hoppers as 33—33 are provided through which rubber or the like for use in the machine may be fed to the respective screw pockets.

The body L is formed with suitable water circulating space 34 therein adapted for cooling said body to a suitable uniform temperature in use, and preferably portions as 35 of said body, which constitute the walls of the screw pockets 7 are formed separate from the remainder of the body as removable tubular sections. These tubular sections are received in suitable bores 36 of the body and are held against longitudinal displacement by means of suitable lock members 37 as will be readily understood from an inspection of the disclosure in Figs. 1 and 5. When these tubular sections 35 are worn beyond efficient use they may be readily removed, by release of the locking members 37, and new tubular sections inserted, thereby rejuvenating the machine in this essential particular. New screws may be inserted as required.

The head G comprises the main part or die carrier 2 having means, such as the ears 38—38 by which it may be bolted onto the body L, and the die 3 which is mounted within the carrier 2. The die is removably held in place within the carrier by means of a screw sleeve 39 and may be laterally adjusted by means of a series of set screws 40—40 extending through the die carrier and engaging peripheral portions of the die at spaced radial points as is customary in machines of this type.

The die is funnel shaped, and the opening 41 at its smaller end is of a larger size than the opening through the tube 6, the size of the opening through the die determining the exterior diameter of the rubber cover 40 as said cover emerges through said opening, while the opening at the larger or inner end of the die communicates with the mixing chamber 9 and thereby embraces both of the screw pockets. The walls of the mixing chamber merge into the conical walls of the die so as to facilitate the easy passage of the rubber through the opening 23 and onto the passing hose tube.

It will be understood that removability of the die 3, and likewise of the guide tube 6 provides for substitution of dies and guide tubes of different dimensions for accommodating hose tubes of different sizes and for applying rubber coverings 4 of different thicknesses upon different hose tubes, as necessity may dictate from time to time.

In order to facilitate easy access into the mixing chamber the present improvement proposes that the head G may if desired be pivotally connected with the body L. For this purpose the drawings illustrate the die carrier 2 as having hinge lugs 42 projecting from one side thereof pivotally connected, by a hinge pin 43 with a hinge lug 44 formed upon the body. The ears 38—38 by which the die carrier is bolted to the body are preferably of the open-ended type as indicated at 45—45, and the bolts as 46 which engage said ears are preferably pivotally connected with the body L as at 47 so that they may be easily swung radially out of the openings 45 after being only slightly loosened.

By this arrangement it will be seen that whenever access into the mixing chamber is desired the operator has merely to slightly loosen the nuts of the clamp bolts 46, swing said bolts out of engagement with the ears, and then swing the whole head about the hinge pin 43 to open position, as indicated by the dotted lines in Fig. 5. When suitable adjustments, or cleaning operations have been effected within the mixing chamber, the head may be again returned and clamped tight against the body by similar simple operation.

It will be understood that in the operation of this machine the rubber from the pockets 7 is fed with great force into and through the mixing chamber 9 and directly into the die from diametrically opposite sides of the guide tube 6. It flows in both directions about said guide tube as it moves the short distance through the die to the opening 23, and due partly to the reducing diameter of the opening through the die and partly to the churning and agitating action of the closely juxtaposed screws the two bodies of rubber from the respective tubes become intimately connected and kneaded together. An homogeneous union, and an even density of the rubber, is secured as the rubber moves through the opening 23 and onto the hose tube.

The disposition of the screw pockets at an acute angle divergent to the line of feed of the hose tube enables the rubber to move forward through the mixing chamber and onto the hose tube without material change in its general direction of travel. This also increases the efficiency of the device.

The base 1 may preferably provide an oil container or tank as 48 within which a quantity of oil 49 may be held in position to receive the lower portions of the gears 18 and 19 and of the sprocket wheels 14, and 15 thereby providing for continuous and efficient lubrication of these moving parts at all times.

Mounted upon the upper surface of the base 1 at the rear of the space 22 is a bracket 50 which provides a U-shaped socket 51 adapted for two distinct purposes:

*First.*—When the machine is in use this socket receives and holds a U-shaped guide block 52 longitudinally aligned with the guide tube 6 adapted to support the hose tube H at a position outside of the rear end of the guide tube, as clearly indicated in Fig. 3.

*Second.*—When the machine is not in use, and it is desired to remove the guide tube 6 or to insert a new guide tube into the opening 5 of the body, the guide block 52 may be lifted out of the socket 51 and the attachment A, hereinbefore referred to, mounted in said socket. The attachment A, as herein illustrated, consists of a block 53 having a size and shape to be removably received within the socket 51. It may be locked within said socket by means of a cross pin 54 inserted through openings as 55 at the upper ends of the legs of the socket.

Within this block is rotatably mounted an internally threaded sleeve 56 to which is connected an operating wheel 57 having a handle 58 by means of which the sleeve may be forcefully rotated in either direction at the will of an operator. Opposing shoulder parts 59 and 60 carried by the sleeve at opposite ends of the block 53 hold the sleeve against any longitudinal movement with respect to the block, while yet permitting easy rotary movement of the sleeve within the block.

A screw 61 engages within the threaded bore of the sleeve 56. This screw carries at one end a head 62 rigid therewith, and adapted to extend into the open rear end of the guide tube 6, said head having an opening 63 formed through itself adapted to receive the tool 28 thereby to fix the head with the tube 6 detachably at any time.

It will be seen that by the use of this attachment an operator may, by rotating the sleeve 56, as by means of handle 58, force the tube 6 either into or out of the opening 5 of the body according to the direction of rotation of said sleeve. A very powerful pull or push, as the case may be, may be applied to the sleeve by only a slight amount of power applied to the sleeve 56.

It will be understood of course that the back stop member 30 must necessarily be lifted out of its guide-ways and removed in order to facilitate either the introduction or removal of a guide tube. It will also be understood that where the interengaging threads 26 are present the guide tube 6 must necessarily be rotated, as by means of the tool 28 to first disengage these threads before the attachment A can be effective to remove the tube, or to bring said threads into co-operative engagement after the attachment A has forced a tube sufficiently far into the opening 5 of the body for this purpose.

After a tube 6 has been inserted by means of this attachment, the attachment may be easily disconnected and removed from the machine, and the U-shaped block 52 again placed in position in socket 51 so that the machine is then again in condition for use.

A machine constructed as herein disclosed is of high efficiency and is yet of a simple, sturdy and practical form. It provides for the intimate mixing of two separate streams of rubber as they are applied onto the hose, and yet ready accessibility is given to all parts for cleaning, removal or adjustment, and the hose guiding tube is so arranged and related to the separately formed attachment that said attachment is easily and conveniently usable for serving its intended purpose of inserting or removing the tube.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described our invention, what we claim as new and desire to secure by Letters Patent is:—

1. A device of the class described comprising a body member having an opening therethrough through which a tube or the like to be covered may be passed, a die axially aligned with said opening, a guide tube arranged in said opening for directly containing and guiding said tube to said die, means to force covering material about said tube and through said die, the guide tube being longitudinally movable within said opening and having a shoulder to engage a portion of the body for limiting movement of the guide tube in one direction, and means to alter the effective position of said shoulder with respect to the guide tube for thereby altering the extent of movement of the guide tube in said direction.

2. A device of the class described comprising a body member having an opening therethrough through which a tube or the like to be covered may be passed, a die axially aligned with said opening, a guide tube arranged in said opening for directly containing and guiding said tube to said die, means to force covering material about said guide tube and through said die, the guide tube being longitudinally movable within said opening and having a shoulder to engage a portion of the body for limiting movement of the guide tube in one direction, and a back stop removably engaged with the body in position to oppose longitudinal movement of the guide tube in an opposite direction.

3. A machine of the class described comprising a body member having an opening therethrough through which a tube or the like to be covered may be passed, a die axially aligned with said opening, a guide tube arranged in said opening for directly containing and guiding said tube to said die, means to force covering material about said tube and through said die, means by which said guide tube is removably held in operative position within said opening, separately formed power applying means by which to forcefully remove said guide tube from said opening and said machine having parts to receive and support said power applying means and by which said power applying means may be operatively connected with the guide tube.

4. A machine of the class described comprising a body member having an opening therethrough through which a tube or the like to be covered may be passed, a die axially aligned with said opening, a guide tube arranged in said opening for directly containing and guiding said tube to said die, means to force covering material about said tube and through said die, means by which said guide tube is removably held in operative position within said opening, a separately formed attachment adapted to be mounted upon said machine and having a power applying part for connection with said guide tube whereby to forcefully remove the guide tube from said opening, and said machine having a portion usable selectively as a guide for a tube to be covered or as a seat in which to support said attachment.

5. A machine of the class described comprising a body member having an opening therethrough through which a tube or the like to be covered may be passed, a die axially aligned with said opening, a guide tube arranged in said opening for directly containing and guiding said tube to said die, means to force covering material about said guide tube and through said die, means by which said guide tube is removably held in operative position within said opening, means to remove the guide tube from said opening comprising a separately formed attachment mountable upon the machine including a manually rotatable internally threaded sleeve and a screw connectible with said guide tube and having thread engagement with the threads of the sleeve, said guide tube having an opening through which a connecting pin may be inserted for connecting the screw with the guide tube, and said machine having a portion usable selectively as a guide for a tube to be covered or as a seat in which to rotatably support said sleeve.

6. A machine of the class described comprising a body member having an opening therethrough through which a tube or the like to be covered may be passed, a die axially aligned with said opening, a guide tube arranged in said opening for directly containing and guiding said tube to said die, means to force covering material about said guide tube and through said die, means by which said guide tube is removably held in operative position within said opening, means to remove the guide tube from said opening comprising a separately formed attachment mountable upon the machine including a manually rotatable internally threaded sleeve and a screw connectible with said guide tube and having thread engagement with the threads of said sleeve, and said machine having a portion usable selectively as a guide for a tube to be covered or as a seat in which to rotatably support said sleeve.

7. A device of the class described comprising a body member having an opening therethrough through which a tube or the like to be covered may be passed, a die axially aligned with said opening, a pair of screws mounted in the body adapted for feeding covering material through the die and onto the tube, a drive shaft, a pair of auxiliary shafts arranged one at each side of the drive shaft and geared thereto to be driven thereby, said drive shafts being in a plane displaced from the axial plane of said screws, and driving connections between said auxiliary shafts and said screws respectively.

8. A device of the class described comprising a body member having an opening therethrough through which a tube or the like to be covered may be passed, a die axially aligned with said opening, a pair of screws mounted in the body adapted for feeding covering material through the die and onto the tube, a drive shaft, a pair of auxiliary shafts arranged one at each side of the drive shaft and geared thereto to be driven thereby, said drive shafts being in a plane displaced from the axial plane of said screws, sprocket wheels carried one by each of said auxiliary shafts, other sprocket wheels carried one by each of said screws, and a pair of sprocket chains one connecting the sprocket wheel of one auxiliary shaft with one of said screws and the other connecting the sprocket wheel of the second auxiliary shaft with the second screw.

ARCHIBALD L. WALLACE.
SVEN BERGSTROM.